US008695033B2

(12) United States Patent
Fasting

(10) Patent No.: US 8,695,033 B2
(45) Date of Patent: Apr. 8, 2014

(54) NETWORKS AND SYSTEMS FOR GENERATING AND/OR DELIVERING HYBRID BROADCAST CONTENT

(75) Inventor: Nikolai Fasting, Oslo (NO)

(73) Assignee: Hydra Media Technology, Inc., New York, NY (US)

( * ) Notice: Subject to any disclaimer, the term of this patent is extended or adjusted under 35 U.S.C. 154(b) by 0 days.

(21) Appl. No.: 13/509,782

(22) PCT Filed: Nov. 10, 2010

(86) PCT No.: PCT/IB2010/003060
§ 371 (c)(1),
(2), (4) Date: May 14, 2012

(87) PCT Pub. No.: WO2011/058440
PCT Pub. Date: May 19, 2011

(65) Prior Publication Data
US 2012/0246677 A1  Sep. 27, 2012

Related U.S. Application Data

(60) Provisional application No. 61/261,146, filed on Nov. 13, 2009.

(51) Int. Cl.
| H04N 7/10 | (2006.01) |
|---|---|
| H04N 7/173 | (2011.01) |
| H04N 7/16 | (2011.01) |
| H04N 7/14 | (2006.01) |
| G06Q 30/00 | (2012.01) |
| G06F 3/00 | (2006.01) |

(52) U.S. Cl.
USPC ............... 725/34; 725/35; 725/110; 725/112; 725/136; 348/14.08; 705/14.72; 715/758

(58) Field of Classification Search
USPC ........................ 725/34, 23, 35, 110, 112, 136; 348/14.08; 705/14.72; 715/758
See application file for complete search history.

(56) References Cited

U.S. PATENT DOCUMENTS

| 7,603,413 | B1 * | 10/2009 | Herold et al. ................. 709/204 |
|---|---|---|---|
| 8,208,001 | B2 * | 6/2012 | Tucker et al. .............. 348/14.08 |
| 2009/0157709 | A1 * | 6/2009 | Kruger et al. ................. 707/100 |
| 2010/0037277 | A1 * | 2/2010 | Flynn-Ripley et al. ........ 725/110 |
| 2011/0055735 | A1 * | 3/2011 | Wood et al. .................... 715/758 |
| 2011/0116409 | A1 * | 5/2011 | Jeong et al. .................... 370/252 |

* cited by examiner

Primary Examiner — Hoang-Vu A Nguyen-Ba
(74) Attorney, Agent, or Firm — Matthew A. Pequignot; Pequignot + Myers LLC

(57) ABSTRACT

Networks and/or devices for enabling and/or providing live or non-live interactivity with televised programming and/or its viewers and/or fans and/or hosts and/or actors and/or contestants. In certain (non-limiting) embodiments, mobile or handheld devices (e.g., mobile phones or laptops) communicably connected or connectable to networks having platforms thereon for permitting or providing live or real-time interactivity with televised programming and/or its viewers/fans/hosts/actors/contestants. In other embodiments, methods for performing or providing the interactivity described herein. In still other embodiments, software, residing on a data storage device, which directs a processor to perform actions in accordance with and/or to obtain one or more of the objectives of the technologies and methods described herein.

14 Claims, 12 Drawing Sheets

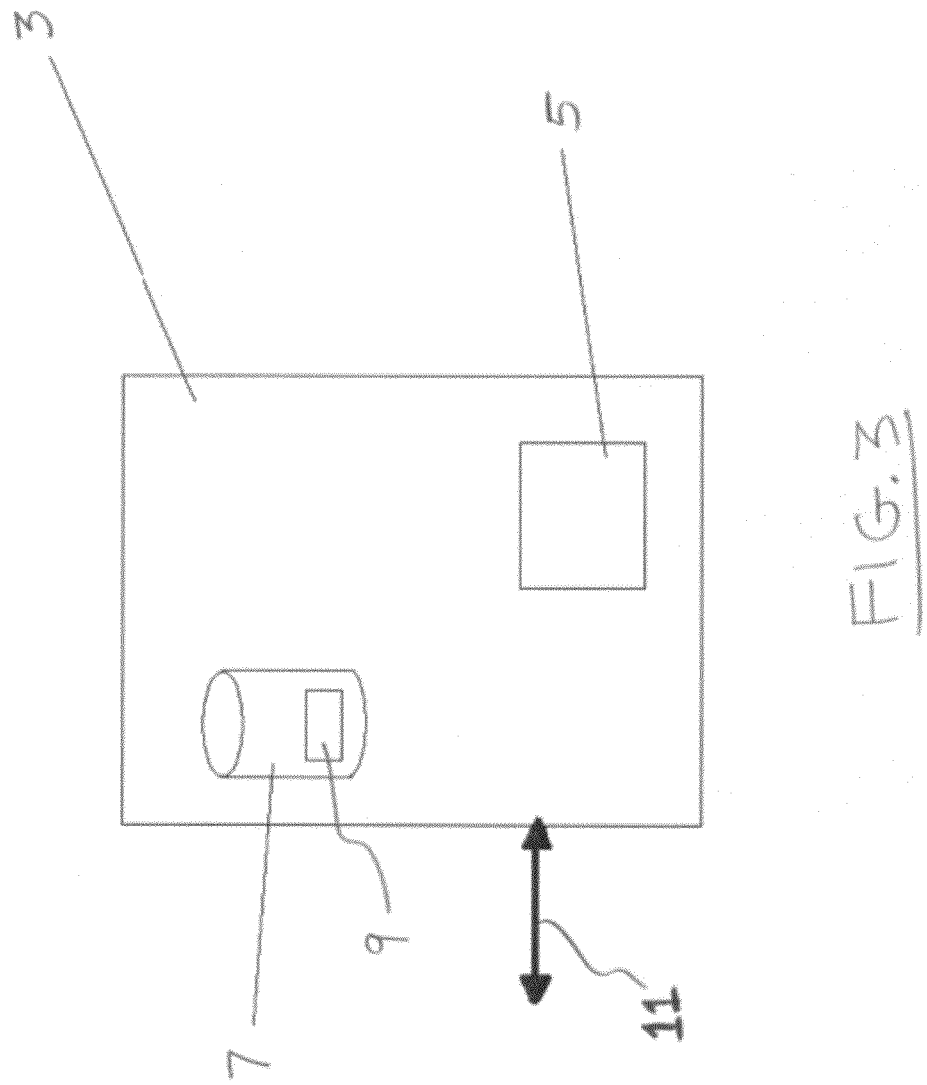

NETWORKS AND SYSTEMS FOR GENERATING AND/OR DELIVERING HYBRID BROADCAST CONTENT

RELATED APPLICATION DATA

This application is the national stage entry of International Appl. No. PCT/IB2010/003060, filed Nov. 10, 2010, which claims priority to U. S. Patent Application No. 61/261,146, filed on Nov. 13, 2009. All claims of priority to these applications are hereby made, and each of these applications is hereby incorporated in its entirety by reference.

FIELD OF INVENTION

This invention relates to networks and/or devices for enabling and/or providing live or non-live interactivity with televised programming and/or its viewers and/or fans and/or hosts and/or actors and/or contestants. In certain (non-limiting) embodiments, this invention relates to mobile or hand-held devices (e.g., mobile phones or laptops) communicably connected or connectable to networks having platforms thereon for permitting or providing live or real-time interactivity with televised programming and/or its viewers/fans/hosts/actors/contestants. In other embodiments, this invention relates to methods for performing or providing the interactivity described herein. In still other embodiments, this invention relates to software, residing on a data storage device, which directs a processor to perform actions in accordance with and/or to obtain one or more of the objectives of the technologies and methods described herein.

BACKGROUND OF THE INVENTION

Throughout much of the early history of television, the number of channels and the amount of broadcast programming from which to select was extremely limited. As a result, because there was limited competition among channels and programming amongst literally millions of television viewers, retention of viewership was not a critical issue in the television industry in its developmental years (although there was certainly still competition among the networks). In the relatively recent modernization of the broadcast industry, however, deregulation of the television and cable industries, combined with the increasing cheapness of producing broadcast content (e.g., costs of producing certain types of new shows—such as reality shows—are remarkably low compared to the cost of producing network sitcoms; advances in technology have drastically reduced the costs of broadcast quality camera equipment; etc.) has resulted in an enormous proliferation of new television and cable channels. With this growth, of course, has come new broadcast content and growing amounts of competition. In short, because there are now literally hundreds of channels available to television viewers in present times (due to cable or satellite technologies, for example), retention of viewership has become an issue of paramount importance.

Similar to the issues with respect to retaining television viewers, it has been difficult for companies to allocate advertising dollars in recent decades. This is due, in large part, to the above-mentioned increasing numbers of competing television channels and programs as well as to the advent of the internet and the availability of search engine ads and advertisements on websites and the like. Moreover, in the past—in conventional television markets, for example—advertisements were paid for and displayed without true knowledge of the make-up of the advertising viewership. As a result, many advertisements are/were displayed or broadcast to viewers entirely outside the demographic for which the advertised goods are/were intended. This non-matching of the advertising to the correct or intended demographic represents a significant waste of advertising dollars.

The inventor of the application for patent contained herein, having recognized each of these drawbacks in the art, has conceived of various technologies, including devices, networks, software applications, and/or methods for addressing one or more (or a combination) of such drawbacks (such invention or inventions not being limited, of course, to embodiments or examples which address any particular one or any specific set of such drawbacks and certainly not all of such drawbacks). More particularly, the applicant for invention herein has conceived of technologies which—at least in certain embodiments—aid in televised broadcast viewer retention and/or aid in the creation and/or selective presentation or delivery of personalized, targeted advertisements (e.g., ads which are delivered to specific users or types of users or demographics and which are therefore more effective and more valuable to the advertiser).

In sum, in view of the above enumerated drawbacks and/or desires for improvements in the art, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, one aspect of the present invention (in at least one, non-limiting embodiment) relates to one or more interactive networks in continuous or selective communication with one or more "interactivity devices" by which interactive communications and/or data transmissions and/or data or image displays may be effected. By way of non-limiting example, certain embodiments of the invention provide a system including a network communicating with (e.g., continuously or selectively) one or more interactive (or interactivity) devices such as a mobile phone, hand held computing device, or laptop computer by which users can interact live or in real-time with televised programming. In different or related example embodiments, a system according to the present invention can provide interactivity among one or more categories of viewers, fans, hosts, actors, or contestants in or of televised (or other type) programming.

In one, non-limiting embodiment of the invention, a system for providing interactivity with televised programming is provided comprising: a network including at least one computer processor, a data storage device, and a set of computer readable code embodied in said data storage device; an interactive device communicably connected or connectable to said network; whereby said computer readable code includes computer readable instructions for directing the operation of said network, said instructions including directives controlling the display of one or more graphical user interfaces and non-interactive displays and controlling at least certain communications with said interactive device, said instructions further being so defined such that they direct said network to contact said interactive device at times corresponding to program air times and to generate and provide opt-in invitations, said interactive device including or receiving an interactive (or at least activatable) element which can be user activated to opt-in to two-way communications with said network; whereby, if a user activates said interactive element to opt-in to invited network communications, an opt-in communication connection is established and said interactive device and said network send and receive data between one and the other; said interactive device including a user interface and wherein said opt-in communication connection, when established, allows interactive communications between said interactive device, via user input, and said network.

In at least one embodiment, a system is provided comprising an interactive device including a display, a processor, and a data storage component, the data storage component including a software application stored thereon for generating on the display a graphical user interface, the software application being selectively connected to a broadcast play-out synchronizing mechanism and/or televised program metadata. In certain embodiments, the software application and/or graphical user interface is user tailorable (or personalizable) and/or network tailorable (or personalizable).

In some embodiments of the invention (described above or below), interactivity with a network and/or televised programming is live or in "real time". However, in other embodiments, interactivity is asynchronous or during non-broadcast or off-air time frames.

In at least one embodiment, a network including a plurality of interactivity devices connected (or selectively connectable) to a televised program production platform is provided. In such an embodiment, the plurality of interactivity devices are used by a plurality of individual users. Further, in such embodiment, the interactivity with the plurality of individual users results in a plurality or body of user generated content (e.g., data or images or combinations thereof) which can be (e.g., selectively or entirely) integrated into a broadcast stream or other content.

In certain embodiments, the personalized or tailored software applications or modules contained on the interactivity devices are created or based upon a standardized (e.g., somewhat genericized) configurable and adaptable software module or framework. Such configurable and adaptable software modules or frameworks can be delivered (e.g., downloaded or "pushed") from a dedicated, centralized application server. In certain embodiments, the modules or frameworks include or integrate services or content such as one-to-one chat, many-to-many chat, voting/polling, play-along type services, question and answer content, on-demand services, and various event driven communication services. In certain embodiments, the personalized or tailored software applications or modules contained on the interactivity devices automatically detect states (e.g., status) or state-types based on broadcast states and/or individual user data enabling the applications or modules to automatically and/or selectively adapt in view, appearance, layout, content, and/or services offerings throughout the day.

In some embodiments of the invention, personalized interaction or interactivity with the televised program content and/or producers and/or program/broadcast moderators is possible or provided. In other or the same embodiments, personalized interaction or interactivity with other interactivity device users is enabled and/or provided.

In at least one embodiment of the invention, users of interactivity devices are directly connected live or in real time to broadcasts of content and/or other content types (e.g., fan discussions, advertisements, etc.) and the software applications or modules automatically adapt to unique users (e.g., according to personal preferences, viewing or other user habits, etc.) to provide individualized user experiences, ads, and/or or content. In such or other embodiments, the applications and/or modules or their content may be ported or shared with friends or other users, such as via online social networks.

In one or more embodiments (e.g., combined with one or more features as described herein above or below), user generated content (e.g., generated via use of one or a plurality of interactivity devices) is integrated with broadcast producer originated content to obtain unique, frequently or continuously evolving hybrid content for broadcasting (e.g., on television) to the same and/or other viewers (whether or not such viewers are users of the herein described interactivity devices). In certain non-limiting embodiments of the invention, it is an object to provide broadcast content which is generated or created from contributions of a plurality of interactivity device users (via live or non-live interaction). In some of such embodiments, "user generated channels" may be created. This, of course (in this embodiment and/or in others), links the experience of the user to the content of the program itself which creates personal stakes in the content and therefore aids in retaining user-viewer interest.

In at least one embodiment of the subject invention, certain user generated or user specific information or content can be integrated with online social networks such as Facebook™ or MySpace™. In the same or alternative embodiments, online-type sites can be created from user content and used as a specialized social network particularly relevant to a specific televised show or topic (e.g., which can be viewed or accessed at will, for example)

In certain embodiments of the invention, a user can port or transfer personalized or individualized user settings and/or content to different devices or platforms or among multiple devices or platforms (e.g., mobile phones, PCs, social network Internet services platforms, set-top boxes, etc.).

In certain embodiments, user generated or related data or content is shared (or can be shared) with other interactivity device users and/or with social networking sites (now existing or created in accordance with the technologies described herein). This permits, in such embodiments, the unique content and/or broadcasts which are created to be shared synchronously and/or non-synchronously with social networking associates (e.g., friends, family members, work peers, etc.) without the need for the networking associates to be physically present or even viewing the content at simultaneous times. Moreover, because of the social component of these embodiments, viewers are likely to be program or content loyal which aids in viewer retention.

In certain embodiments, data may be tracked or collected by producers of the broadcast content so that it may be monetized (e.g., by generating tailored advertising).

In some embodiments of the invention, opt-in invitations may be delivered by email or SMS or MMS-type message. Alternatively, opt-in invitations may be delivered by proprietary software applications and/or graphical user interfaces. Election to receive opt-in messages (e.g., for a specific television program) may be similarly achieved by initiating a subscription type action via email or SMS message or by some other mechanism (e.g., a custom software application). For example, if a user wishes to receive opt-in invitations for the show American Idol™, the show producers might provide the option to subscribe to opt-in invitations via "texting" an SMS message such as the word "SUBSCRIBE" to a shortcode (e.g., "AIOPTIN") corresponding to the American Idol™ opt-in program. Opt-in invitation acceptance may occur by use of hyperlinks, for example, such as when invitations are sent via email or may be accepted by return text where SMS messaging is being employed (other methods for invitation acceptance being acceptable, of course).

In still further non-limiting embodiments, advertisements or coupons (for example) may be generated and/or delivered or displayed based on user-viewer activity or interests (or demographics) and/or delivered or displayed to members of user-viewer social networks based on their member association and therefore presumed interest in one or more specific user-viewer interests and/or because of related demographic data or categories. Furthermore, user selected advertisements (e.g., ads clicked on or otherwise confirmed as viewed by a user-viewer or social network member) may be tracked or logged so that data from such views can be used to further tailor advertising content or delivery or presentation (and therefore make it more effective and therefore more valuable).

Certain examples of the invention are now below described with respect to certain non-limiting embodiments thereof as illustrated in the following drawings wherein:

BRIEF DESCRIPTION OF THE DRAWINGS

FIG. 3 schematically illustrates certain detail of the network hub depicted in FIGS. 1 and 2.

DETAILED DESCRIPTION OF CERTAIN EMBODIMENTS

For a more complete understanding of the present invention, reference is now made to the following description of various illustrative and non-limiting embodiments thereof, taken in conjunction with the accompanying drawings in which like reference numbers indicate like features.

Figure 1:
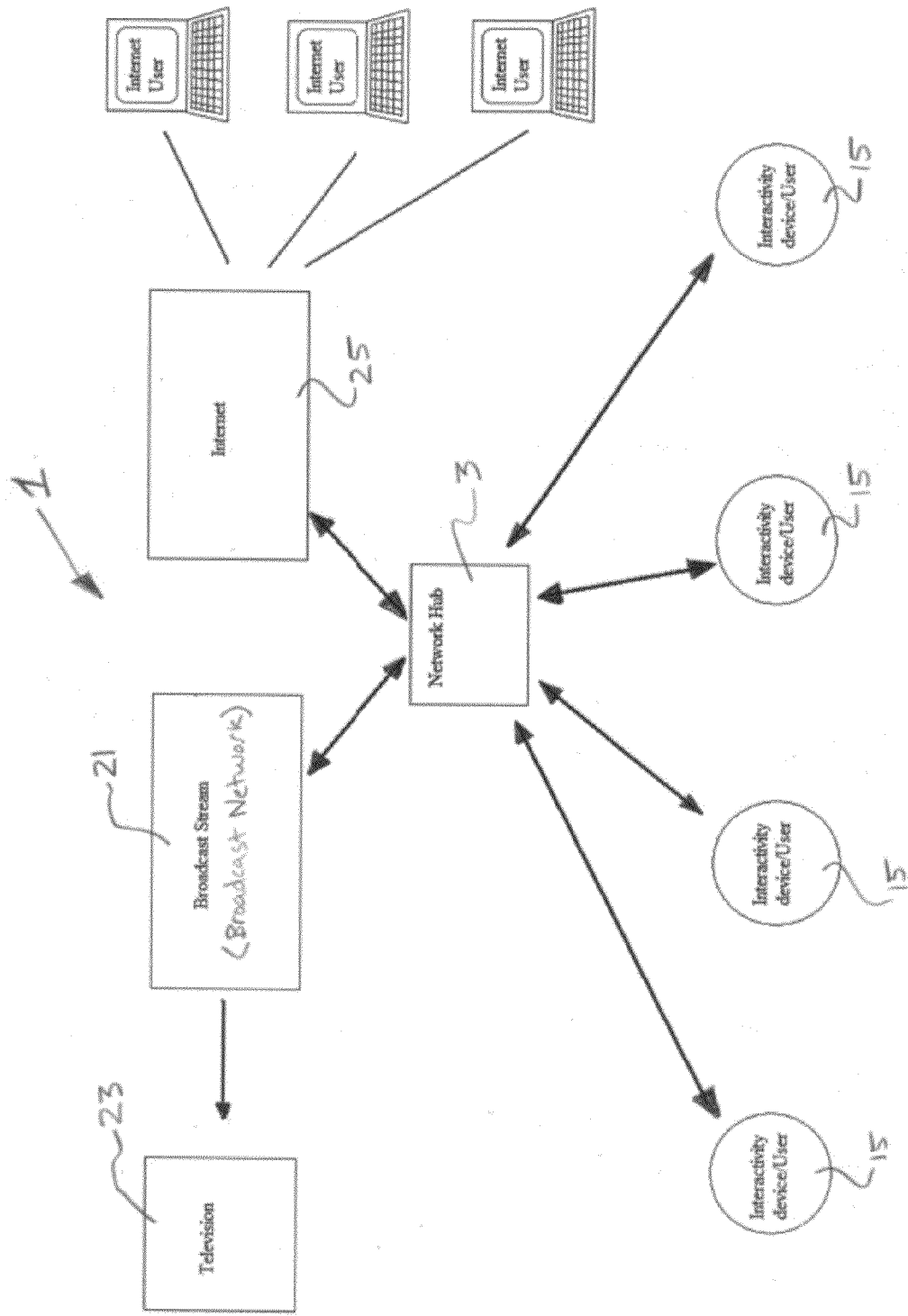
FIG. 1 schematically illustrates one embodiment of an example system according to the subject invention.
Figure 2:
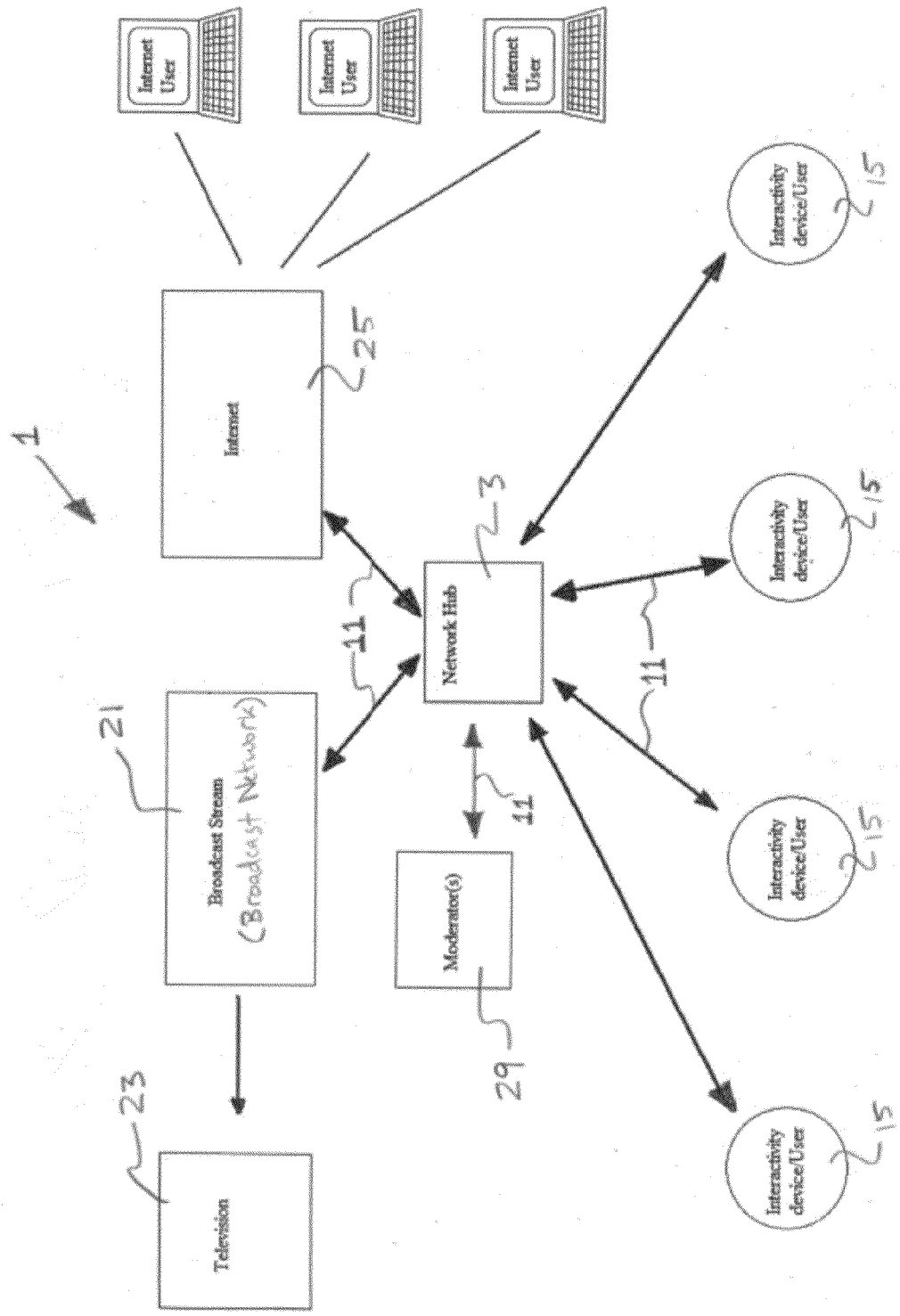
FIG. 2 illustrates an alternative embodiment of the system illustrated in FIG. 1 with one or more moderators additionally being utilized.

Referring initially to FIGS. 1-3, a non-limiting, example embodiment of a system according to the invention is depicted therein. Generally speaking, system 1 comprises a network hub (e.g., a server) or interactivity platform 3 which includes a computer processor 5, a data storage device 7 (e.g., a hard drive, a flash drive, or some other memory storage device or combination of devices), and a set of computer readable code 9 embodied in the data storage device. The network hub 3 further includes data communication lines or ports or network cards or devices 11 by which data may be transmitted to and from the network hub. A plurality of interactivity devices 15 are also provided communicably connected or at least connectable to the hub ("communicably connected" may mean wirelessly connected and/or actually physically connected by wire or other physical means and may include intermittent or continuous connection(s)). Although, in practice, such interactivity devices may be one or more of a number of possible devices such as a handheld computing device, a laptop, a mobile phone or the like, the illustrated example interactivity devices 15 are iPhones® (manufactured by Apple Inc.) which contain software applications specifically tailored and configured to communicate with network hub 3. Similarly, the computer readable code 9 contained on the data storage device of the network hub is specifically written or configured to include executable directives and instructions so that it executes steps and sends and receives communications and data in accordance with and to accomplish the objectives of the inventive technologies described herein.

In addition to the (e.g., selective) communication links between network hub 3 and the plurality of interactivity devices 15, the hub (or platform) is also connected to a broadcast network 21 (or integrated with or part of the network) so that data (including possibly images) or communications compiled or created or received by the combination of interactivity devices and/or hub can be transmitted to the broadcast network for transmission as a television signal 23 and ultimate display as a television program. Moreover, in some example embodiments (such as shown), hub 3 (and/or interactivity devices 15) may be in contact with or connected to the internet or so-called World Wide Web 25 (whether continuously or selectively). In such embodiments, interaction with or modification or creation of websites or web streams may be achieved employing one or more aspects of the subject system described herein (or, alternatively, the system may be accessed or interacted with via "the web".

EXAMPLES

In one example embodiment of the invention, two basic modes of interactivity devices 15 are utilized (and are entered and exited and/or controlled by specifically configured software applications) in the inventive system. Of course, in other embodiments of the invention, fewer or greater numbers of modes may be employed.

In this example, the first or default mode is termed the OFFLINE mode. In the OFFLINE mode, the application may appear dormant (and in other embodiments may actually be dormant) but is otherwise populated with data or, at least, may selectively access data stored elsewhere on the device or remotely on the hub or even a webpage, for example. Such data may correspond to demographic data or to user characteristics such as likes/dislikes, viewing preferences, hobby information, or other personal data.

In such an embodiment, using the availability of such (or other) data, advertisements or coupons can be prepared and/or delivered to a user's interactivity device which are specifically tailored or focused based on such data. In certain exemplary embodiments, certain data may be collected or captured based on interactivity device usage and then used to selectively deliver or create advertisements or coupons. In still other embodiments, employing optional features in the interactivity devices such as global positioning (or other location determining) technologies, advertisements or coupons can be delivered to a device user at opportune times such as when the user (presumably carrying the device) enters the proximity of a particular type of merchant or store. For example, if data either entered into the interactivity device by the user or collected based on usage indicates that the user enjoys or is a fan or a particular type of automobile, if the user (carrying the device) travels to an area within the proximity of an automobile dealership which sells such automobiles, an invitation to test drive that particular type of automobile may be delivered to the interactivity device user. Such an invitation may be delivered to the user via a SMS text message, MMS, email, or even a phone call (whether automated or live, as desired). Alternatively, such an invitation can simply be caused to display on the phone display having been generated by the resident application software.

As additional examples, if it is known from user data that the particular interactivity device user likes ice cream, a coupon (or simply just an ice cream related advertisement) can be delivered to the user via the interactivity device when the user comes within proximity of an ice cream shop or grocery store, at random intervals in the case of embodiments where global positioning type technologies are not used, and/or, in embodiments in which local time of the interactivity device is monitored, at times corresponding to afternoon or evening meal times. In embodiments in which the local time of the interactivity device is monitored, the "local" time may be determined by conventional means such as by querying or identifying the time according to access or proximity to specific cellular towers or via a combination of software applications and global positioning information.

In still additional embodiments, in the OFFLINE mode, an interactivity device user may run the software application in conjunction with internet web surfing or posting ("OFFLINE" not specifically referring to access, or lack thereof, to an internet connection). This may occur via access through the software application itself or while the software application is running in "the background" on the device. In alternative embodiments in which the software application is dormant during web or internet usage, the software application may access data collected or analyze internet traffic or usage or may access or parse (or query) a website (such as a "fansite" dedicated to a particular television show or a social networking site) once the software application is activated or otherwise taken out of a dormant mode. Of course, while the above described features are desirable, in some embodiments, the software application may remain dormant during the entire time (or substantially the entire time) that the device is in the OFFLINE mode.

In a preferred (but non-limiting) embodiment of the invention, a user, via the resident software application (or via some other technique device or method), can select interactive television programs in which the device user has an interest. For example, it is envisioned that the popular television program American Idol can be transformed or converted into a program containing interactive broadcast content. For sake of discussion, then, the program American Idol (hereinafter "AI") will be used herein to illustrate various features of one or more embodiments of the subject invention. In such an embodiment in which an interactivity device user chooses to select AI as desired programming, a user can select to be notified regarding all broadcasts of AI or, in the alternative, may choose to be notified of only new (non-rerun) broadcasts, for example. Selection of notification preferences and the like may be accomplished using the software application contained on the interactivity device (e.g., combined with a data or internet type connection) or may otherwise be achieved using a conventional internet or web interface which is linked, via personal user account information or identification, to the interactivity device (routed via internet communications, cellular communications, or some combination thereof, through hub 3 and/or other network components).

In an example where a user has selected, via an interactive device (or other technique or method), to receive notifications of all AI broadcasts, at some selected time interval prior to an AI broadcast (or simultaneous with the beginning of such a broadcast), the software application will generate an "opt-in" invitation which will be delivered (e.g., via SMS, MMS, or email) or otherwise displayed to the user on the interactivity device (e.g., via presentation of a unique graphical user interface or GUI to the user). At such time, if the device user wishes to participate in the interactive aspects of the AI broadcast or simply to view unique content presented in conjunction with such a broadcast, the user can accept the invitation. This may be accomplished in a number of ways including, but not limited to, return SMS, MMS, or email message, or simply by interacting with a graphical user interface (see FIGS. 4A-4B and 5-11) presented by the resident software application in association with an opt-in invitation. For example, an opt-in invitation may be presented with two graphical buttons or links, one indicating acceptance of the opt-in invitation and the other indicating a decline of the invitation. If the invitation is declined, the application and/or interactive device will remain in the OFFLINE mode (whether dormant or otherwise). However, if the invitation is accepted, the act of acceptance serves as a live-mode-trigger which activates the LIVE mode of the application and the interactivity device. Once the LIVE mode is entered, the user and the interactivity device are linked to the television program and its interactive content (and possibly fan networks, etc.) as described in more detail below.

Once a user has opted in to the LIVE mode, two-way communications with the network are enabled and/or begin. In this regard, accepting an opt-in invitation effectively logs the user in to the network and, in particular, to the interactive components of the particular television broadcast or show. Once logged in, data can be sent and received back and forth amongst the interactive device and the network.

For example, polls or questions might be sent from the network to the interactivity device for the user to participate in or otherwise answer. In at least one embodiment, the polls or questions are displayed on the interactivity device display (e.g., the screen of an iPhone™) In preferred embodiments, the polls or questions will relate to the content of the broadcast or television show itself, and by engaging the interests and participation of the user, help retain show or broadcast viewership. Of course, in certain embodiments, the polls or questions need not be specifically related (or related at all) to the programming being broadcast. Moreover, other data, including images (whether real or graphical), can be transmitted or displayed to an interactivity device user, whether or not such data involves or contains interactive components or otherwise.

Just as data can be sent from the network to interactivity device users (to all users generally, or tailored data may be sent to specific users based on personal or demographic information), interactivity device users can transmit data to the network. For example, in conjunction with participating in a poll, a user may (in some embodiments) upload a photo of his or herself to be transmitted to the network with poll answers. Such a photo may be pre-stored in the interactivity device, or, in cases in which the interactivity devices include cameras (such as with iPhones®), a photo may be taken with the interactivity device and uploaded proximal to the time of providing the poll response. In such an embodiment, the photo of the user may be displayed in the associated television broadcast (e.g., in association with poll results) such as at the bottom of a television screen simultaneous with the poll statistics. Similarly, if the user has simply answered an individual question, the user's photograph may be displayed in connection with the user's broadcast answer. It should be noted, in such embodiments, that the operator of the network may employ or use a panel of screeners or moderators 29 (see FIG. 2) to review photos and the like for content prior to displaying such photos in a television broadcast. Such screeners or moderators would be linked to the network in an appropriate location in the chain of image/data processing via conventional mechanisms such as a typical internet connection if remotely located from the network hub or a LAN type connection (e.g., 11) if located near to the network hub.

In still further embodiments, it is contemplated that users of interactivity devices 15 can be provided with software tools or applications to create and submit their own polls or questions (or other content) to the network. Such polls or questions (or other content) could then be distributed to other users operating in LIVE mode, so that such users, using their respective interactivity devices, can respond to the polls or provide answers to the questions. In such an embodiment, although not required, the answers or responses can then be routed to a screening or moderating panel so that the content can be reviewed for possible integration into the broadcast stream. In yet another embodiment (or in some combination with the previously described embodiments), the polls or questions might be routed to screeners or moderators prior to being distributed to other users of the interactivity devices.

In one or more embodiments (e.g., combined with one or more features as described herein above or below), user generated content (e.g., generated via use of one or a plurality of interactivity devices) is integrated with broadcast producer originated content to obtain unique, frequently or continuously evolving hybrid content for broadcasting (e.g., on television) to the same and/or other viewers (e.g., whether or not such viewers are users of the herein described interactivity devices). In certain non-limiting embodiments of the invention, broadcast content is created which is generated from contributions of a plurality of interactivity device users (via live or non-live interaction). In some of such embodiments, "user generated channels" may be created. This, of course (in this embodiment and/or in others), links the experience of the user to the content of the program itself which creates personal stakes in the content and therefore, once again, aids in retaining user-viewer interest. Although, in some of such embodiments, interactivity with a network and/or televised programming is live or in "real time", in other embodiments, interactivity is asynchronous or during non-broadcast or off-air time frames.

In at least one embodiment of the invention, users of interactivity devices are directly connected live or in real time to broadcasts of content and/or other content types (e.g., fan discussions, advertisements, etc.) and the software applications or modules automatically adapt to unique users (e.g., according to personal preferences, viewing or other user habits, etc.) to provide individualized user experiences, ads, and/or content.

In at least one embodiment, a network including a plurality of interactivity devices 15 connected (or selectively connectable) to a televised program production platform is provided. In such an embodiment, the plurality of interactivity devices are used by a plurality of individual users. Further, in such embodiment, the interactivity with the plurality of individual users results in a plurality or body of user generated content (e.g., data or images or combinations thereof) which can be (e.g., selectively or entirely) integrated into a broadcast stream 21 or other content.

In certain embodiments, the personalized or tailored software applications or modules contained on the interactivity devices are created or based upon a standardized (e.g., somewhat genericized) configurable and adaptable software module or framework. Such configurable and adaptable software modules or frameworks can be delivered (e.g., downloaded or "pushed") from a dedicated, centralized application server (e.g., from hub 3). In certain embodiments, the modules or frameworks include or integrate services or content such as one-to-one chat, many-to-many chat, voting/polling, play-along type services, question and answer content, on-demand services, and various event driven communication services. In certain embodiments, the personalized or tailored software applications or modules contained on the interactivity devices automatically detect states (e.g., status) or state-types based on broadcast states and/or individual user data enabling the applications or modules to automatically and/or selectively adapt in view, appearance, layout, content, and/or services offerings throughout the day.

In certain embodiments of the invention, a user can port or transfer personalized or individualized user settings and/or content to different devices or platforms or among multiple devices or platforms (e.g., mobile phones, PCs, social network internet service platforms, set-top boxes, etc.).

In certain embodiments, user generated or related data or content is shared (or can be shared) with other interactivity device users and/or with social networking sites (now existing or created in accordance with the technologies described herein). This permits, in such embodiments, the unique content and/or broadcasts which are created to be shared synchronously and/or non-synchronously with social networking associates (e.g., friends, family members, work peers, etc.) without the need for the networking associates to be physically present or even viewing the content at simultaneous times. Moreover, because of the social component of these embodiments, viewers are likely to be program or content loyal which aids in viewer retention. In such embodiments, fans of a particular show may be permitted to communicate (e.g., with words, data, or images) with one another individually or on a group basis, for example.

In at least one embodiment of the subject invention, certain user generated or user specific information or content can be integrated with online social networks such as Facebook™ or MySpace™. In the same or alternative embodiments, online-type sites can be created from user content and used as a specialized social network particularly relevant to a specific televised show or topic (e.g., which can be viewed or accessed at will, for example).

Recognizing that the use of the interactivity devices described herein will (or at least potentially can) generate large amounts of data pertaining to demographic preferences and interests related to television programming as well as affinity towards consumer or commercial products and the like, in certain embodiments it is envisioned that such data will be collected or tracked by producers of the broadcast content so that it may be later monetized. Such data may be monetized, for example, by generating tailored advertising— that is, advertising tailored towards specific demographics based on learned preferences—or by delivering generic advertisements to specific viewers or demographics based on learned interests and preferences. In other embodiments, individually targeted advertising can be created and/or served based on social internet service or network profiles (or other suitable data profiles) alone or in combination with user television viewing habits.

In at least one embodiment of the invention, users of interactivity devices can access information related to what their friends are watching (e.g., "friends" on the herein described network or system and/or "friends" imported from social networking profiles). Moreover, users can communicate with such friends (e.g., via internet chat type functionalities) regarding the programming being viewed and/or interacted with.

In addition to the use of the example of the American Idol show, other television show types and programming may, of course (such as suggested above), be used or integrated with (or even generated by) the technologies described herein. For example, car shows featuring automobile "demos" and expert discussions; food centric shows such as cooking shows featuring downloadable recipes (and permitting uploading and exchange of recipes among users, etc.) and interviews with featured chefs; and dating shows may be integrated.

Referring now to FIGS. 4A-B and 5-11, screen shots 41 of an example graphical user interface of an interactive device are illustrated therein. Such screen shots represent (some of) the various views of an interactive display which can be accessed on an interactivity device 15 display screen. In the illustrated examples, the information, data, images, etc. which are pictured as part of the graphical user interface are, in some cases, mere displays but in other cases can be interacted with or at least selected (e.g., to "click through" to additional information or to another screen or display) using a touch screen and/or a "pointing device" or "scrolling device" (e.g., a joystick, multidirectional button, mouse-type device, or rotatable wheel). Of course, these figures are illustrative of non-limiting examples only and are not intended to limit the scope of the subject invention.

Figure 4A:
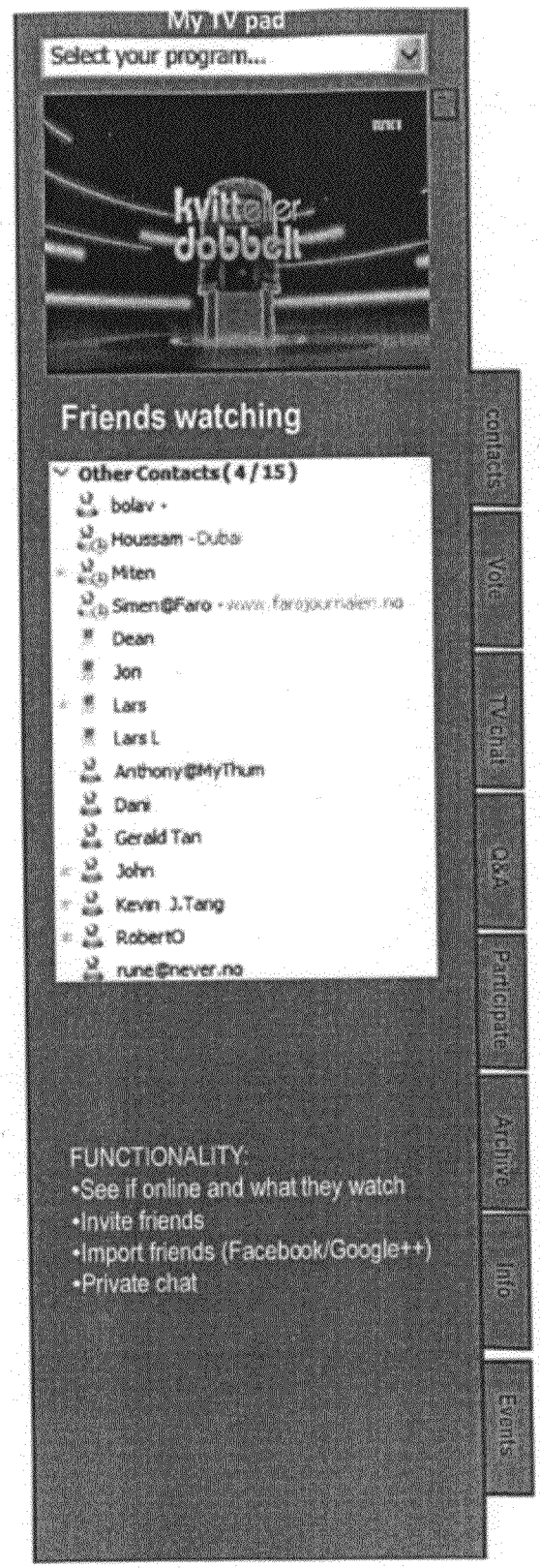
FIGS. 4A-4B and 5-11 illustrate example screenshots of an embodiment of a graphical user interface contained on interactivity devices useful in the systems of the subject invention.
Figure 4B:
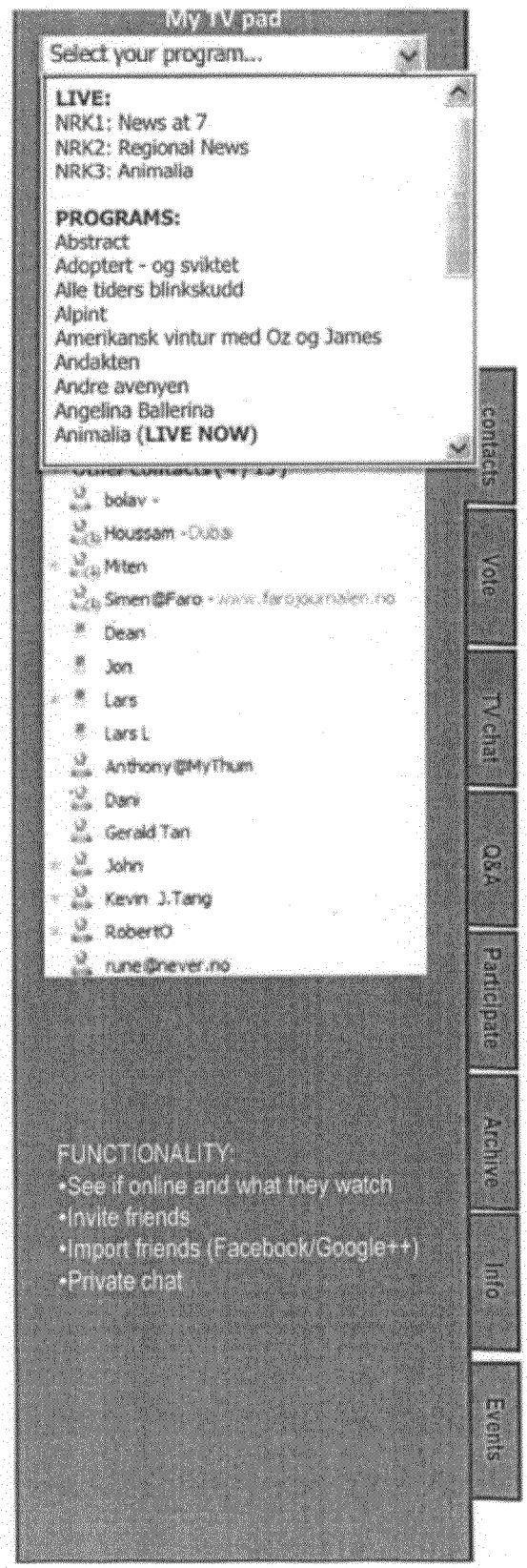

FIGS. 4A and 4B illustrate the graphical interface with the "Contacts" tab selected. In these views, users can see who is "online", invite friends, import friends or contact information from third party sources, and initiate chats among members. Moreover, FIG. 4B, in particular, shows a conventional drop down menu which can be used to select the show or program to be viewed/interacted with (and also indicates, for example, program broadcast status).

Figure 5:
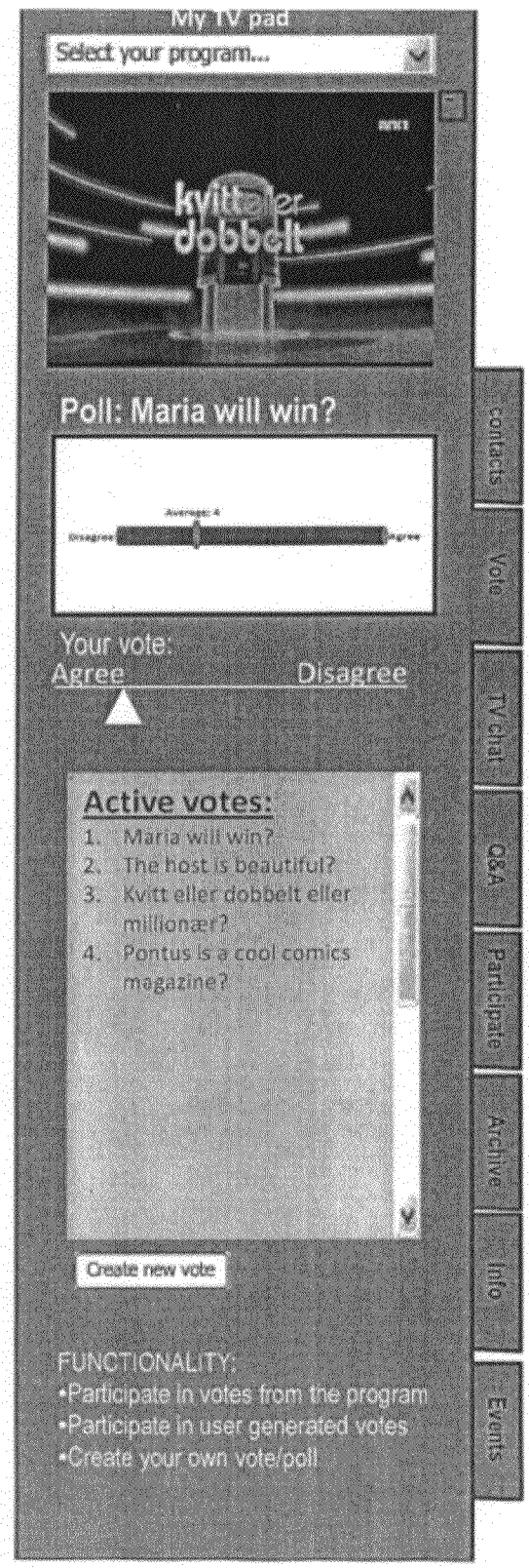

FIG. 5 depicts the GUI with the "Vote" tab selected. When selected, users can participate in the voting functionality and features of the system (e.g., including creating a user generated poll).

Figure 6:
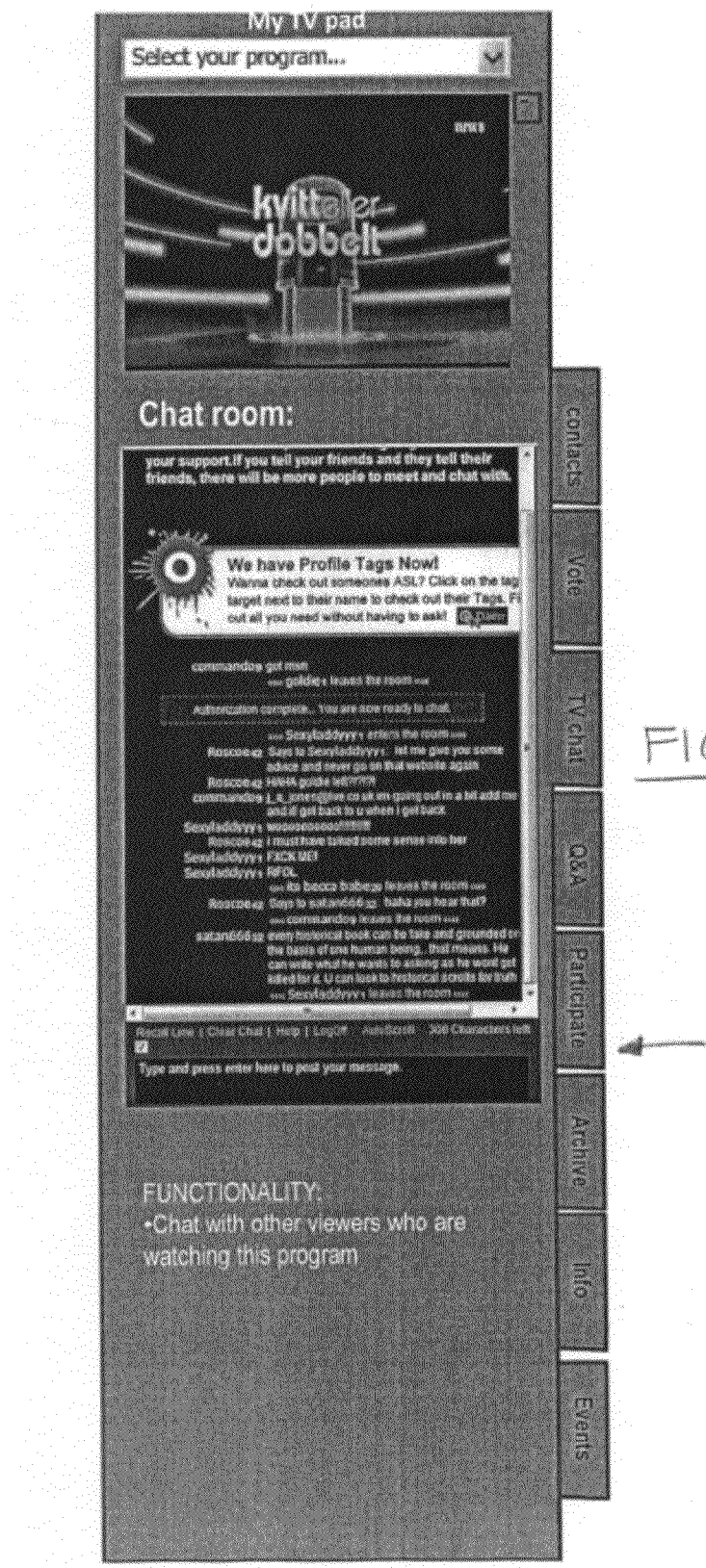

FIG. 6 illustrates the software interface when the "TV Chat" tab has been selected. In such mode, users can chat with other users that are viewing the same program (and have accepted "opt in" invitations, for example).

Figure 7:
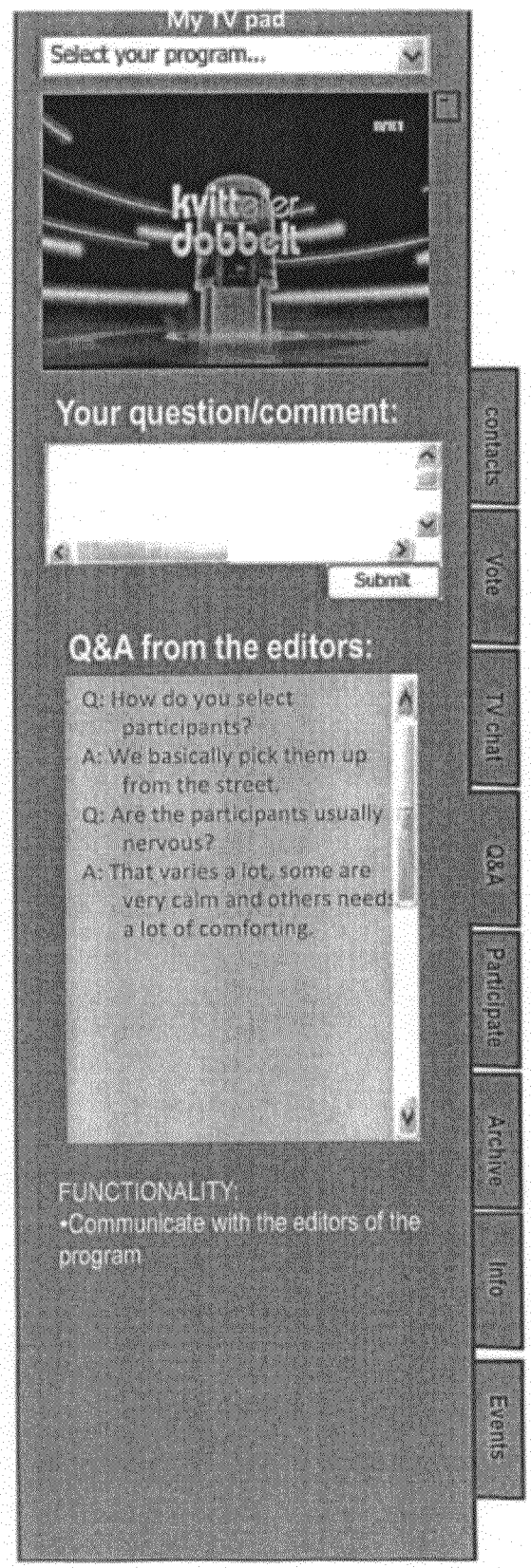

In FIG. 7, the "Q&A" mode has been selected. In such mode, a user is permitted to ask questions of moderators, editors, or program producers, for example (and can possibly view pre-answered questions, "Frequently Asked Questions", etc.).

Figure 8:
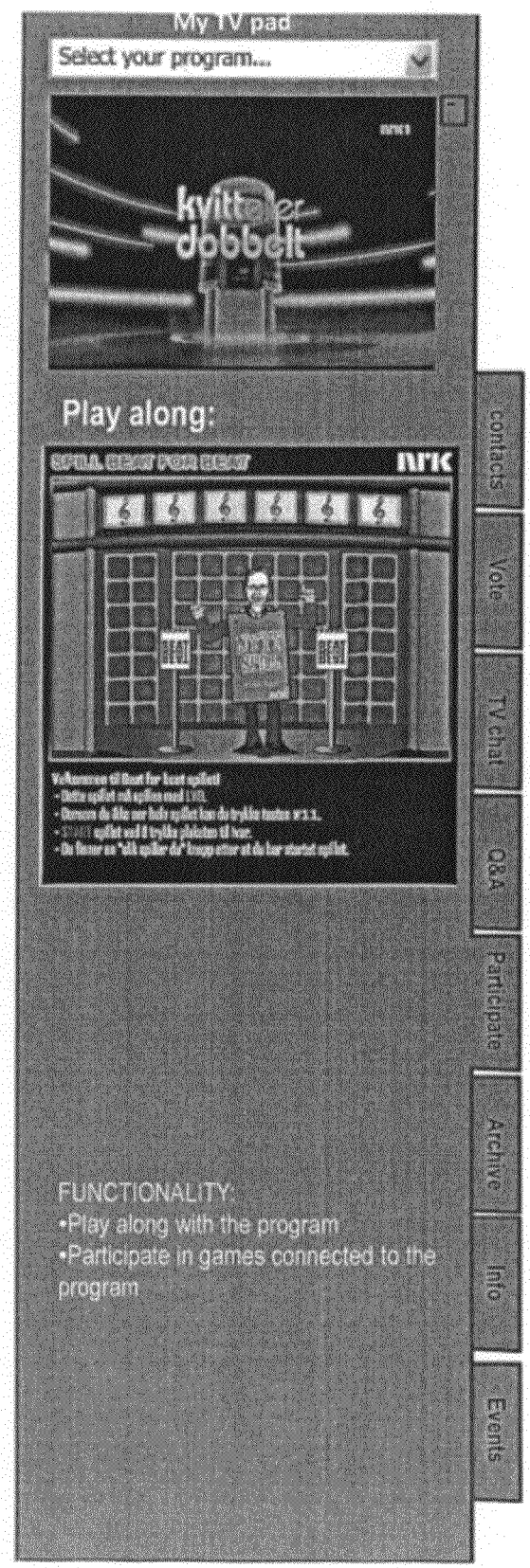

FIG. 8 illustrates the GUI when the "Participate" tab has been selected. In this mode, a user can play along with the program (e.g., in a "game show" type program) and/or participate in games connected to or affiliated with the program being broadcast.

Figure 9:
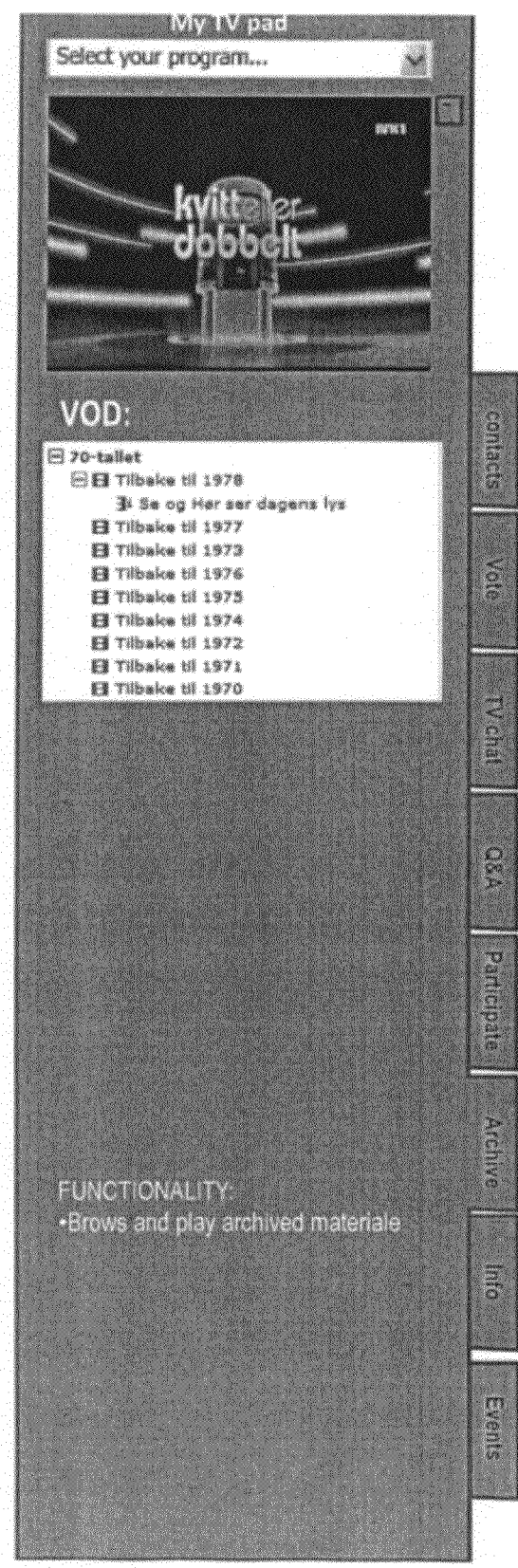

FIG. 9 illustrates a mode—the "Archive" mode—in which past, archived programming or games or other information can be accessed. Further, archived games may be played, for example.

Figure 10:
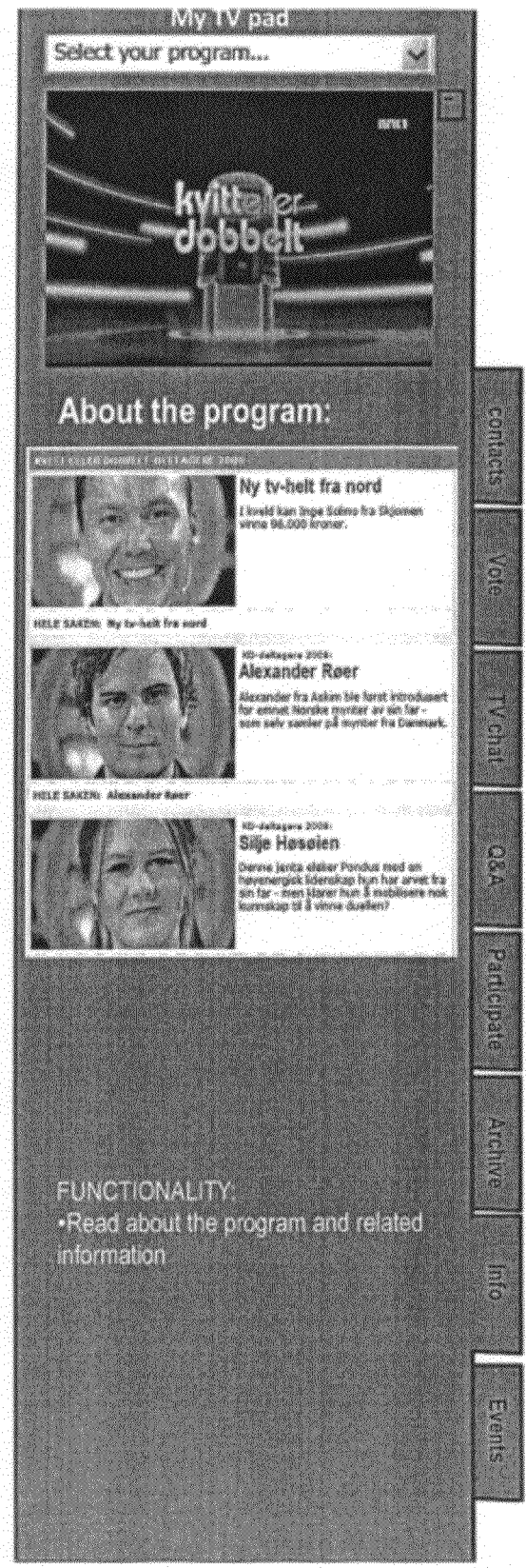

In the "Info" mode illustrated in FIG. 10, information about the current program being broadcast can be accessed (e.g., general information, show history, game rules, etc.).

Figure 11:
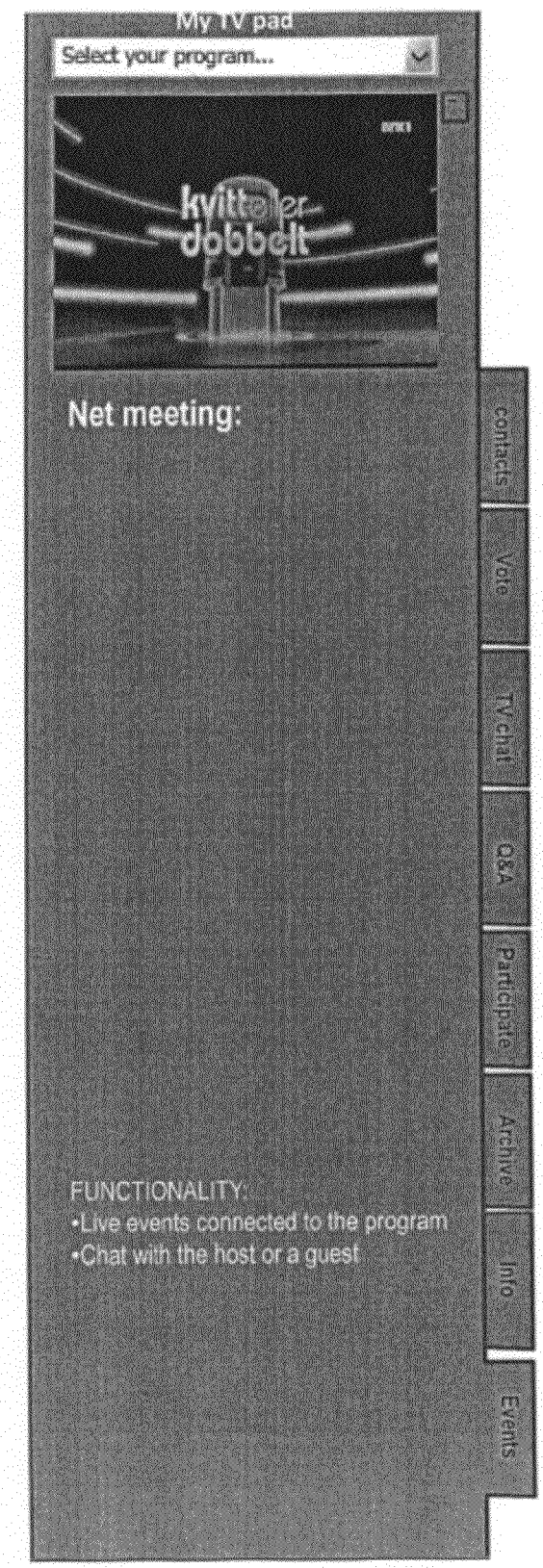

FIG. 11 illustrates a mode in which the "Events" tab has been chosen. While in such mode, a user can participate in live events connected with the program or can chat or otherwise communicate with the host of the program, a program player, or some other type of program guest.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

I claim:

1. A system for providing a tailored, personalized, and interactive experience in conjunction with televised programming comprising:
   a network including at least one computer processor, a data storage device, and a set of computer readable code embodied in said data storage device;
   a plurality of interactive devices communicably connected to said network;
   whereby said computer readable code includes computer readable instructions for directing the operation of said network, said instructions including directives controlling at least certain communications with said plurality of interactive devices, said instructions further being so defined such that they direct said network to contact said plurality of interactive device at times corresponding to program air times and to communicate opt-in invitations, said plurality of interactive devices including or receiving an interactive mechanism which can be user activated to opt-in to network communications upon receipt of an opt-in invitation communicated from said network;
   whereby, if a user activates said interactive mechanism to opt-in to invited network communications, said respective interactive device, upon which said interactive mechanism has been activated, and said network and/or a broadcast producer, send and receive data among each other;
   said plurality of interactive devices each including a user interface and wherein said opt-in communication connection, when established, allows interactive communications between said plurality of interactive devices, via user input, and said network, and further allows interactive communications between different users of said plurality of interactive devices;
   said interactive communications including or being formulized into one or more of data, text, video, images, photos, voting, polling, question and answer content, and chat; and
   wherein interactivity among a plurality of users of said respective plurality of interactive devices with each other and with said network, combined with personal or demographic or location information collected from said users or said plurality of interactive devices, results in unique, user generated content for integration into a televised broadcast stream, website or webcast or for display on one or more of said plurality of interactive devices;
   said system further comprising means which generates hybrid broadcast content based on an integration of said user generated content with broadcast producer originated content, said hybrid broadcast content thereafter being available for viewing by or broadcast to viewers and interactive device users.

2. A system according to claim 1, wherein said unique, hybrid content is frequently or continuously evolving.

3. A system according to claim 1 wherein data entered into or detected by said plurality of interactive devices is transmitted to said network and is selectively integrated into a broadcast television program.

4. A system according to claim 1 wherein data entered into or detected by said plurality of interactive devices is transmitted to said network and is selectively integrated into a webcast or website.

5. A system according to claim 1 wherein said plurality of interactive devices are devices selected from the group consisting of: a mobile phone; a hand-held computing device; a lap top computer; and a desktop computer.

6. A system according to claim 1 wherein images or photos or live video can be collected by said plurality of interactive devices and displayed, via said network, on a live or pre-recorded televised program.

7. A system according to claim 1 wherein individual interactive device users can specify other interactive device users as friends; and wherein said plurality of interactive devices contain location determining devices which collect geographic location information which is available to interactive device users so that such interactive device users can view information related to the geographic location of said friends.

8. A system according to claim 7 wherein individual interactive devices are linked to social networks or profiles and can transmit and receive data to and from said social networks or profiles.

9. A system according to claim 8 wherein data is collected from said plurality of interactive devices and is utilized to create or serve tailored advertisements or coupons to interactive device users.

10. A system according to claim 8 wherein unique content or broadcasts which result from said user generated content are shared synchronously or non-synchronously with social networking associates without the need for said social networking associates to be physically present or viewing the content at a simultaneous time.

11. A system according to claim 8 wherein said user generated content is integrated with content of said social networks or profiles.

12. A system according to claim 7 wherein data is collected from said plurality of interactive devices related to viewer and user habits and is utilized to create or serve tailored advertisements or coupons to interactive device users.

13. A system according to claim 1 wherein individual interactive device users can specify other interactive device users as friends; and wherein interactive device users can view information related to what identified friends are watching on television as detected by information collected by said plurality of interactive devices.

14. A system according to claim 13 wherein individual interactive devices are linked to social networks or profiles and can transmit and receive data to and from said social networks or profiles.

* * * * *